United States Patent
Gallington

[11] 3,885,431
[45] May 27, 1975

[54] BALANCE TYPE ANGLE OF ATTACK INDICATOR

[76] Inventor: Roger W. Gallington, Qtrs. 4307 H, USAF Academy, Colo. 80840

[22] Filed: Aug. 28, 1973

[21] Appl. No.: 392,376

[52] U.S. Cl. ............................................. 73/180
[51] Int. Cl. .......................................... G01c 21/00
[58] Field of Search ...................... 73/180, 188, 189

[56] References Cited
UNITED STATES PATENTS
2,237,306  4/1941  Hood .................................... 73/180
3,500,685  3/1970  Gwathmey ........................... 73/180

*Primary Examiner*—Donald O. Woodiel
*Attorney, Agent, or Firm*—Arsen Tashjian

[57] ABSTRACT

An angle of attack indictor for use as a cock pit instrument including movable elements which respond to the differences in pressure at selected points on the aircraft. The pressure points include total pressure sensed by the aircraft pitot tube ($p_o$), atmospheric pressure sensed at aircraft static pressure port ($p_\&$) and pressure sensed from at least one port on wing surface (p). The difference of one pair of pressures is divided by the difference of a second pair of pressures to obtain the pressure coefficient which is a direct indication of the angle-of-attack of the aircraft.

2 Claims, 7 Drawing Figures

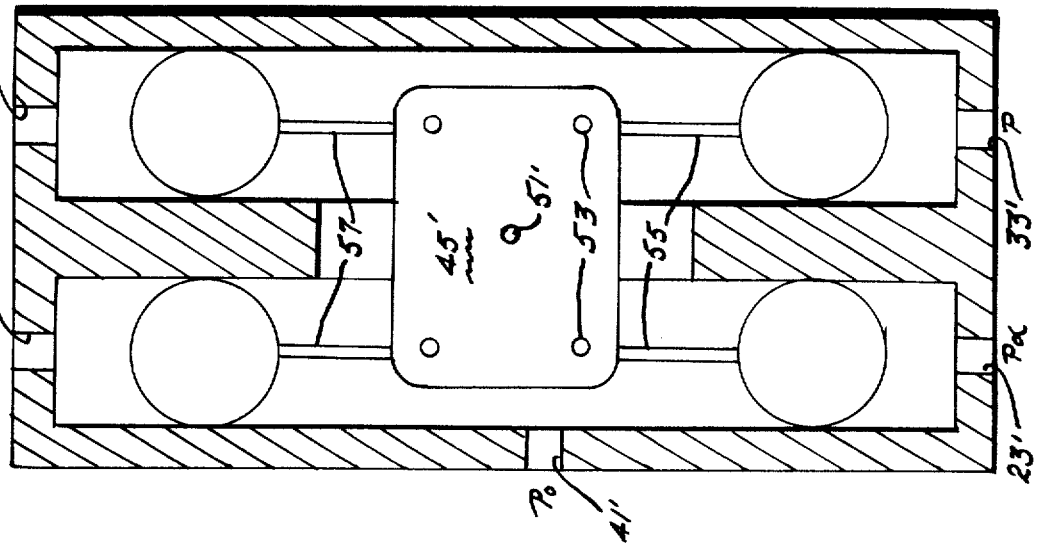
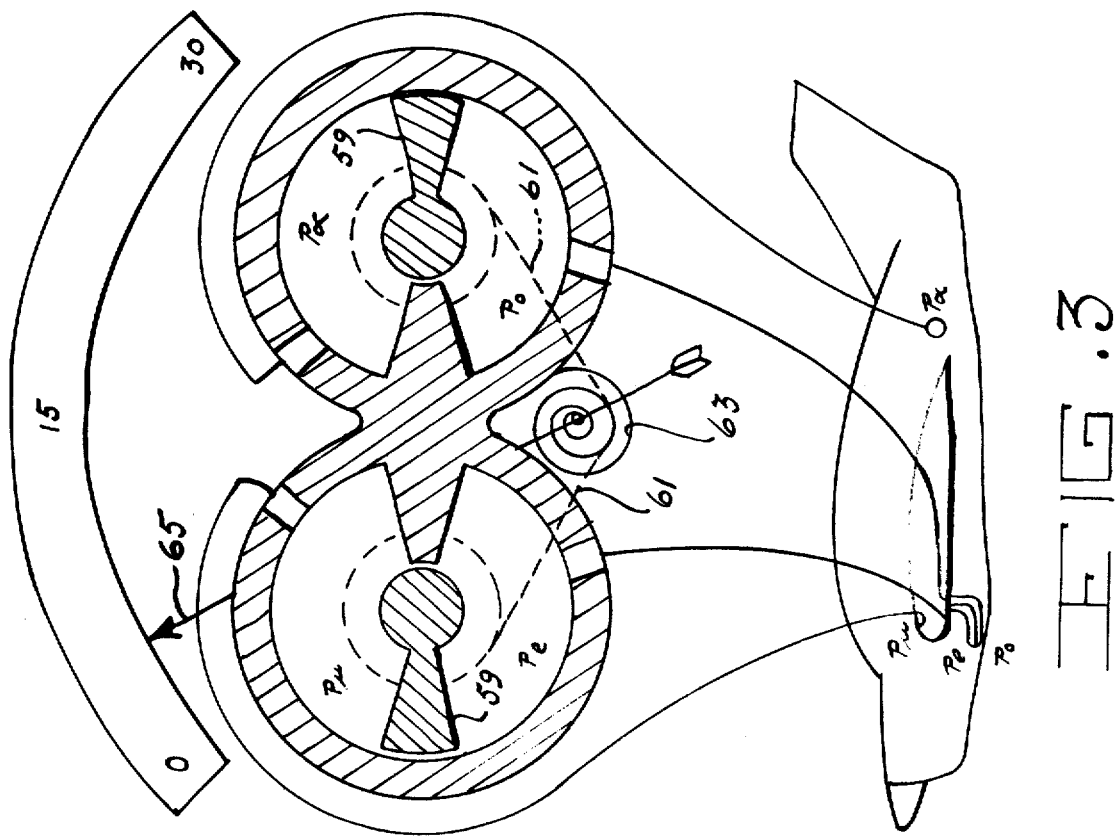

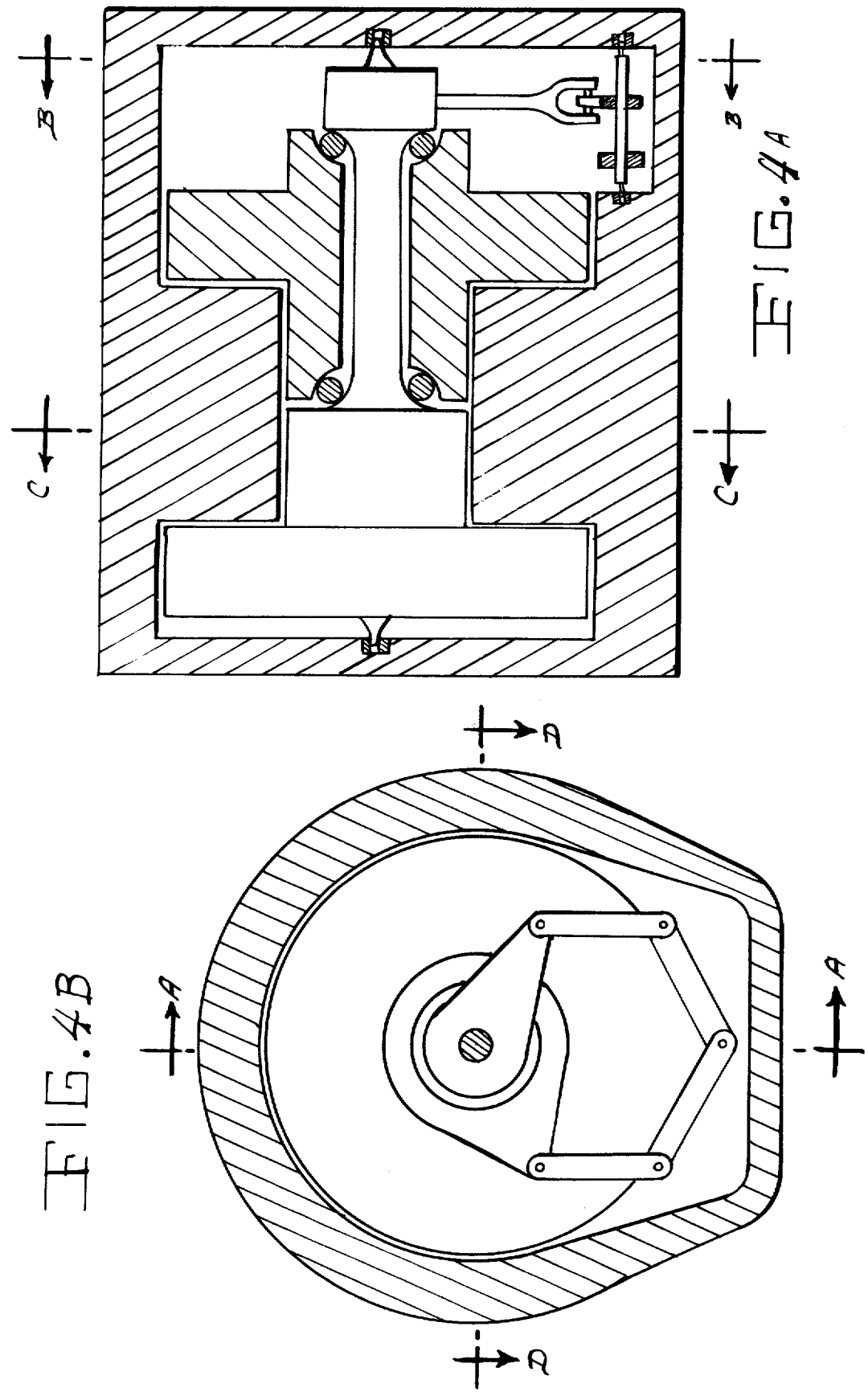

BALANCE TYPE ANGLE OF ATTACK INDICATOR

BACKGROUND OF THE INVENTION

This invention relates to an angle of attack indicator and, more particularly, the invention is concerned with providing a balance type instrument for use on aircraft to give an indication depending only on the pressure coefficient and, consequently, only the angle of attack from the pressure measured at at least three points on the aircraft.

The "angle of attack" may be defined as the term given to the angle of air flow relative to the chord line of a wing. This value is critical during most phases of flight especially including takeoff, climb, cruise, glide, approach, missed approach and landing. In takeoff the normal procedure is to head the aircraft down the runway at full throttle and accelerate the aircraft to takeoff airspeed and then apply a slight amount of back pressure to the control column. The airspeed must then increase to a point of providing sufficient lift to support the aircraft in flight. Since we are depending on airspeed along, the lift-off point is rather uncertain and can be unnecessarily delayed by too little or too much back pressure on the control column. Too little back pressure will cause the aircraft to attain higher than normal speed before sufficient lift is obtained. This can produce a time delay and result in the use of additional runway. Too much back pressure to the control column will cause a decrease in the forward velocity of the aircraft because of the increase in drag, resulting in a loss of lift and an aborted takeoff.

Since the wing lift is related to its angle of attack, an indication of this angle to the pilot can improve his takeoff procedure and make his control function positive. The takeoff procedure utilizing the angle of attack information would be to proceed down the runway while accelerating to the takeoff airspeed recommended for the particular aircraft and then apply a steadily increasing back pressure to the control column while referring to the angle of attack indicator. Utilizing this procedure, the aircraft will become airborne when its wing angle of attack is the proper value for sustaining lift. By following the above procedure the aircraft will become airborne in the least distance with a positive reference to the actual wing lift.

During final approach and landing, it is important to maintain the aircraft at the minimum maneuvering airspeed which is normally 30 percent above stall airspeed. The actual airspeed is a compromise at the discretion of the pilot to compensate for varying conditions of aircraft load, weather and wind velocity and wind shear. However, because of the aircraft's inertia as well as the natural lag in response of the airspeed, it is difficult for the pilot to keep the airspeed constant and, consequently, keep the glide angle constant. Thus, it would be desirable to provide an angle of attack indicating system which is instantaneously responsive so that the pilot could maintain the aircraft at the best approach angle of attack and, therefore, a constant glide angle. This would enable the pilot to fly the aircraft closer to the stall angle with confidence especially if it were necessary to land in a relatively short runway distance.

SUMMARY OF THE INVENTION

The present invention is concerned with providing a balance type angle of attack indicator for use in inexpensive aircraft or aircraft operating in severe conditions, such as icing, rough ground handling, combat, etc. The operation of the indicator is based on the principle that pressures sensed at appropriately selected points on an aircraft can be used to obtain the pressure coefficient which is formed by dividing the difference of one pair of pressures by the difference of a second pair of pressures. the pressure coefficient thus formed depends only on the angle of attack of the aircraft. A large variety of mechanisms can be designed for utilizing this principle to obtain the aircraft angle of attack.

The operation of the balance-type angle of attack indicator can be explained by observing the pressure coefficient which is given by:

$$c_p = [(p - p_o)/(p - p_\infty)] \tag{1}$$

where:

$p_o$ is the total pressure sensed by the aircraft pilot tube, $p_\infty$ is the atmospheric pressure sensed by the aircraft static pressure port, and $p$ is the pressure sensed by a static pressure port on the wing surface.

The pressure coefficient is a function of the shape of the aircraft, the position of the static pressure port on the wing surface and the angle of attack of the wing. Therefore, if one fixes the geometry of the airplane and the position of the static port on the wing surface, then the pressure coefficient, $c_p$, depends only on the angle of attack.

Accordingly, it is an object of the invention to provide an angle of attack indicator based on the principle that a now-trivial pressure coefficient formed by dividing the difference of two pressures by a different difference of two pressures, a minimum of three pressures being required, depends only on the angle of attack.

Another object of the invention is to provide a balance type angle of attack indicator that is inexpensive to manufacture yet is reliable and rugged making it especially suitable for use in relatively inexpensive aircraft. The pilots of lighter military aircraft can be provided with an angle of attack indicator, for the first time, leading to more accurate and safer approaches with fewer missed approaches.

Still another object of the invention is to provide balance type angle of attack indicator wherein the pressure coefficient is determined by conveying the changes in pressure from various points on the aircraft to a cockpit instrument including a bellows arrangement which operates a linkage system to indicate the angle of attack of the aircraft.

A further object of the invention is to provide a balance type angle of attack indicator wherein the pressure coefficient is determined by the operation of a cockpit instrument including a ball-cylinder mechanism to which the pressures from various points on the aircraft are conveyed. The relative movement of the balls in response to the pressure variations produces a corresponding movement of a series of links attached to a rocker to thereby give the angle of attack of the aircraft.

A still further object of the invention is to provide a balanced angle of attack indicator wherein a rotary mechanism is caused to rotate in response to pressure variations at selected points on the aircraft. A pulley-cable arrangement translates the movement of the rotary mechanism to a needle which is calibrated to directly indicate the angle of attack of the aircraft.

These and other objects, features, and advantages will become more apparent after considering the following detailed description taken in conjunction with the annexed drawings and appended claims.

BRIEF DESCRIPTION OF THE DRAWINGS

FIG. 2 is a shematic view of another embodiment of the invention wherein the various pressures are conveyed from the aircraft to a ball-cylinder type mechanism causing linkages to move vertically and produce corresponding movement in a rocker;

FIG. 3 is still another embodiment of the invention wherein pressures from the selected points on the aircraft are conveyed to chambers on either side of rotatable vanes with a pulley-cable arrangement for transmitting the movement to a needle to indicate the angle of attack;

FIG. 4A is a cross-sectional view of a fourth embodiment of the invention taken along the line A—A of FIG. 4B showing another rotary balance type angle of attack indicator with a linkage type balance option:

FIG. 4B is a cross-sectional view of the embodiment of the invention taken along the line B—B of FIG. 4A;

DESCRIPTION OF A PREFERRED EMBODIMENT

Figure 1:
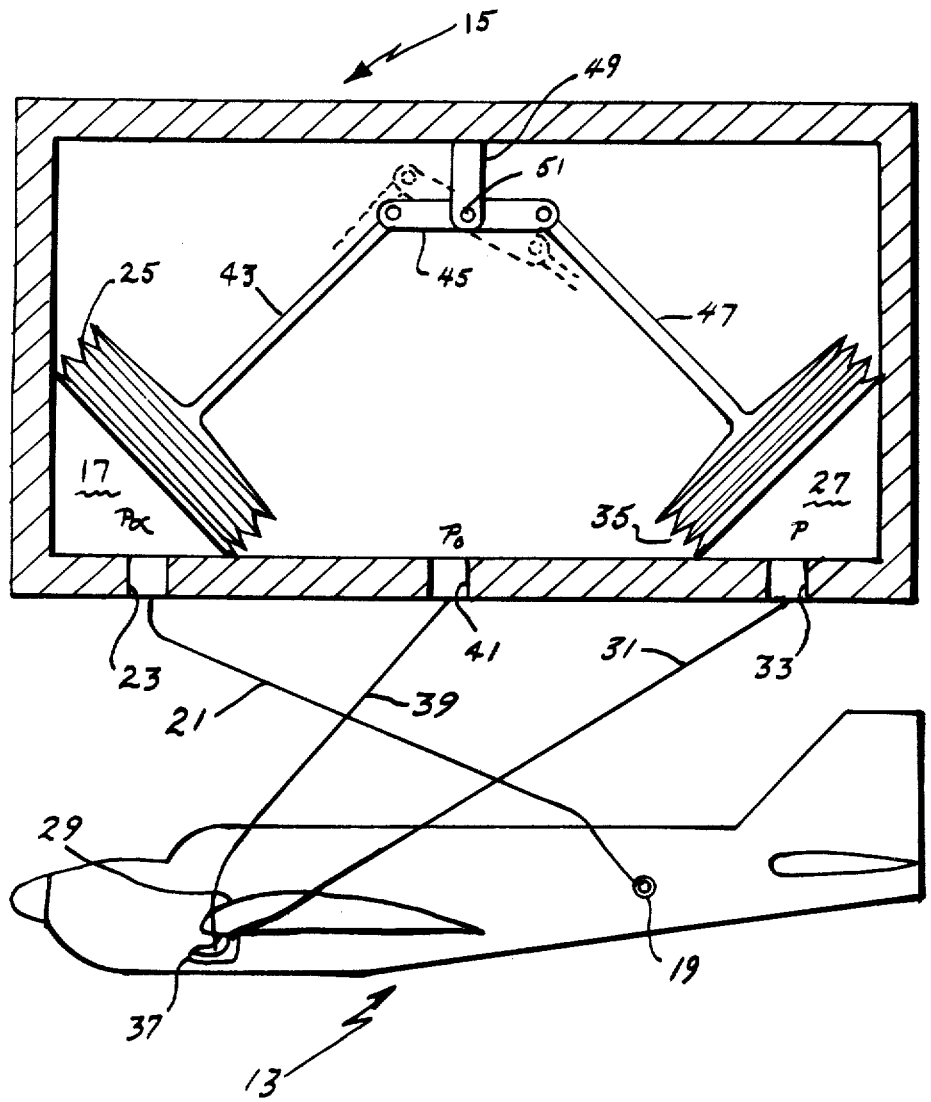
FIG. 1 is a schematic view of a balance type angle of attach indicator according to the invention showing the bellows and linkage mechanism of the cockpit instrument and the positions on the aircraft from which the pressures are conveyed.
Figure 4D:
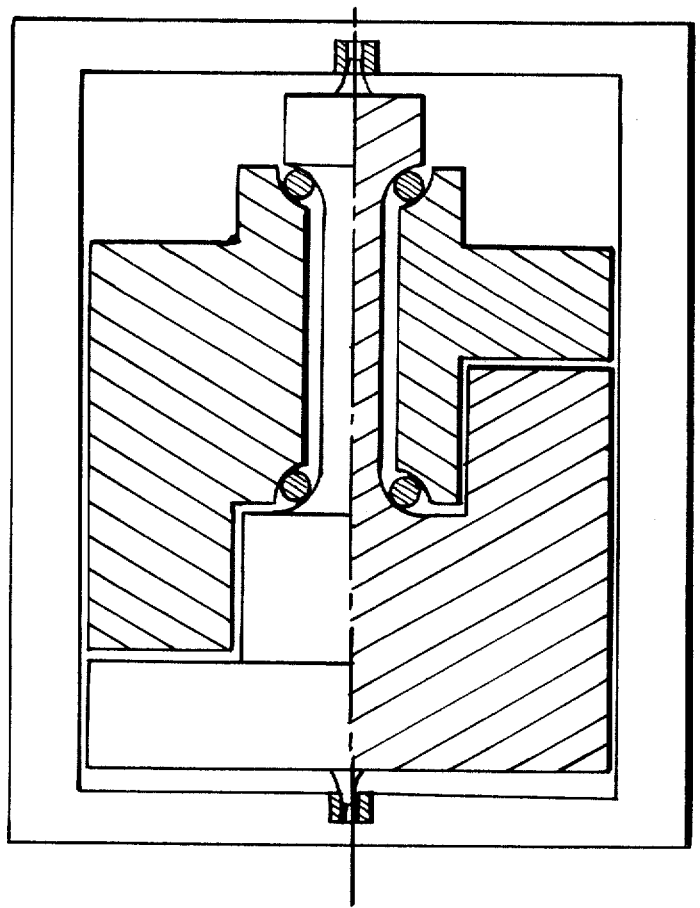
FIG. 4D is a cross-sectional view of the embodiment of the invention taken along the line D—D of FIG. 4B.
Figure 4C:
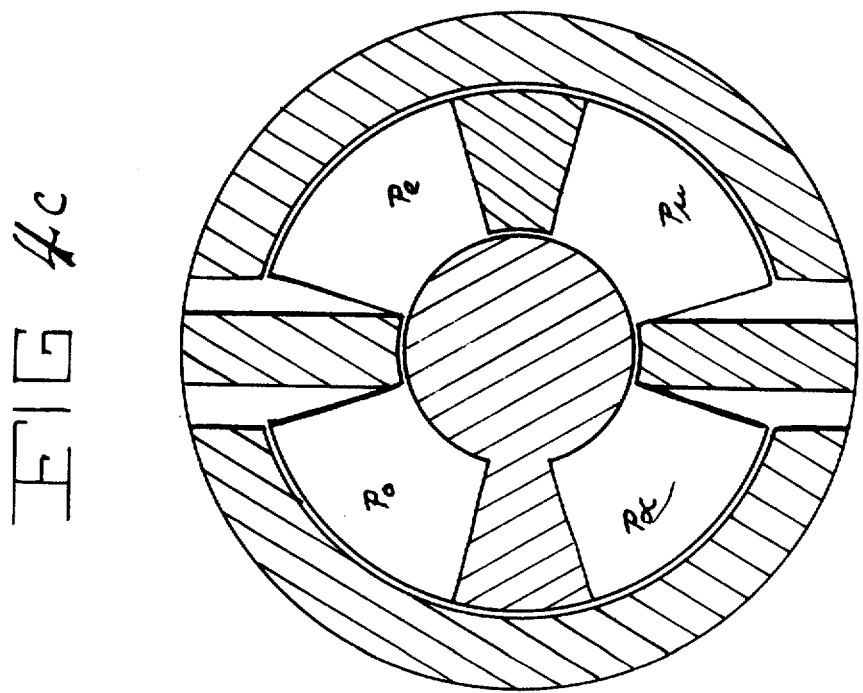
FIG. 4C is a cross-sectional view of the embodiment of the invention taken along the line C—C of FIG. 4A.

Referring now to the drawings, in FIG. 1 there is shown one of the preferred embodiments of the invention which indicates the angle of attack of the aircraft 13. The indicator itself includes an enclosure 15 which is effectively divided into three sections. The first of the sections 17 is operatively connected to the static pressure port 19 of the aircraft 13 by means of the tube 21 through the opening 23 in the enclosure 15. A bellows 25 separates the section 17 from the remainder of the enclosure 15. A second section 27 is operatively connected to the wing static pressure port 29 of the aircraft 13 by means of the tube 31 through the opening 33 in the enclosure 15. Likewise, the section 27 is separated from the other sections of the enclosure 15 by another bellows 35. The remainder of the enclosure 15 is operatively connected to the aircraft pitot tube 37 by means of the tube 39 through the opening 41 in the enclosure 15.

A link 43 is fixedly attached to the upper surface of the bellows 25 and extends upwardly at an angle to be pivotably attached to one end of a rocker 45. Another link 47 fixedly attached to the upper surface of the bellows 35 extends upwardly at an angle and is pivotably attached to the other end of the rocker 45. A support arm 49 extends downwardly from the top of the enclosure 15 for holding a pivot 51 around which the rocker 45 rotates.

In FIG. 1, as the angle of attack of the aircraft 13 is increased, the pressure $p$, sensed at the wing static pressure port 29 becomes lower reflecting the increased lift. The pressure $p_o$ sensed at the aircraft pitot tube 37 and the pressure $p_\infty$ sensed at the aircraft static pressure port 19 remain unchanged assuming constant speed, air density and atmospheric pressure. The lowered pressure $p$ is conveyed from the wing static pressure port 29 through tube 31 to the bellows 27 in the cockpit mounted enclosure 15. The reduced pressure in bellows 27 increases the tension in link 47 encouraging the rocker arm 45 to rotate clockwise on pivot 51. As the rocker arm 45 rotates clockwise, the tension in link 47 acts on a reduced moment arm about pivot 51 while the tension in link 43 acts over an increased momemt arm about pivot 51 due to "canting out" of the bellows and links. The rocker arm 45 seeks a new equilibrium position where the tension in link 47 times its moment arm about pivot 51 equals the tension in link 43 times its moment arm about pivot 51. Thus, each aircraft angle of attack results in a single equilibrium position of the rocker arm 45. Conversely, the position of the rocker arm 45 is an indication of the angle of attack.

To show that the position of the rocker arm 45 does not change as the airspeed of the aircraft 13 is changed at a constant angle of attack, consider first the particular angle of attack where $p = p_\infty$ causing the rocker arm 45 to be level in the equilibrium position. As the speed is increased, $p_o$ is increased causing equal increased in the tensions in bellows 25 and 35 and consequently links 43 and 47. The rocker arm 45 maintains its level position provided $p$ and $p_\infty$ do not change with the increased airspeed. $P_\infty$ is simply the atmospheric pressure which is, of course, unchanged by changes in aircraft speed. If $p = p_\infty$ before the change in airspeed, the pressure coefficient, $c_p$, at the static pressure port is zero from equation (1).

FIG. 2 shows a cross-section view of an instrument using a ball-cylinder mechanism instead of bellows. The pivots attaching the lower links 55 to the rocker arm 45' are below the pivot 51' serving the same purpose as the "canting out" of the bellows and links in FIG. 1. The upper links 57 and the ball-cylinder mechanism are added to make the instrument perfectly symmetrical thus eliminating any effects of gravity or acceleration on the instrument. The ball-cylinder mechanism can be made out of metal and lubricated with light oil or made out of Teflon or silicates and operated dry. It is not necessary for the ball-cylinder mechanism to be perfectly leakproof. All that is required is that the leakage area be much less than the area of tubes and ports leading to the instrument.

In FIG. 3 there is shown an instrument with rotary mechanism replacing the links and rocker arms. This instrument can use four pressures. For example, total pressure $p_o$, static pressure $p_\infty$, a pressure from the upper surface of the wing $p_u$ and a pressure from the lower surface of the wing $p_\ell$. As the angle of attack changes during flight, the vanes 59 rotate causing the cable 61 to produce a corresponding rotation of the spiral pulley 63 which makes the needle 65 move to a new position which indicates the new angle of attack.

In FIGS. 4A, 4B, 4C and 4D there is shown various views of another rotary mechanism balance type angle of attack indicator with a linkage type balance option.

Although the invention has been illustrated and described in terms of preferred embodiments thereof, it will be apparent to those skilled in the art that certain changes, alterations modifications, and substitutions, particularly with respect to the construction details, can be made in the arrangement and location of the various pressure sensings elements without department from the true spirit and scope of the appended claims.

Having thus set forth and disclosed the nature of my invention, what I claim is:

1. A balance type angle of attack indicator for use in an aircraft cockpit instrument comprising means for sensing the pressure in at least three selected positions on the aircraft, one of the selected positions at which the pressure is sensed being the pitot tube of the aircraft, another of the selected positions being the atmospheric pressure at the aircraft static pressure port, and still another of the selected positions being located on the wing of the aircraft, tubing means for transmitting the pressures to a central area, and means for mechanically dividing the difference between one pair of pressures by the difference between a second pair of pressures including an enclosure having three operatively connected sections, the first of said sections being formed in the lower left side portion of the enclosure by the inner surface of a first bellows with a link arm extending angularly upward therefrom, the second of said sections being formed in the lower right side portion of the enclosure by the inner surface of a second bellows with a link arm extending angularly upward therefrom, the third of said sections being formed in the central portion of the enclosure between the first and second sections in operative communication with the outer surface of said first and second bellows, pressure from a different selected position on the aircraft being transmitted to each of the sections in said enclosure, each of said first and second bellows expanding linearly in response to differences in pressure at the selected positions on the aircraft and linkage means connected to said bellows link arms for translating the linear movement of said bellows into rotational movement to give an accurate indication of the angle of attack of the aircraft.

2. The balance type angle of attack indicator defined in claim 1 wherein pressure from the aircraft static pressure port is transmitted to the first of the sections having the first bellows therein, pressure from a wing static pressure port being transmitted to the second section having the second bellows therein and pressure from the aircraft pitot tube being transmitted to the third of the three operatively connected sections in the enclosure.

* * * * *